United States Patent
Doi

(10) Patent No.: US 7,545,409 B2
(45) Date of Patent: Jun. 9, 2009

(54) IMAGING MODULE AND DATA RECEIVING APPARATUS

(75) Inventor: Shunichiroh Doi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 541 days.

(21) Appl. No.: 11/452,919

(22) Filed: Jun. 15, 2006

(65) Prior Publication Data

US 2007/0041630 A1    Feb. 22, 2007

(30) Foreign Application Priority Data

Jun. 20, 2005    (JP)    ............... P 2005-179378

(51) Int. Cl.
*H04N 5/232* (2006.01)
(52) U.S. Cl. ............... 348/211.1; 348/222.1; 455/556.1
(58) Field of Classification Search ... 348/211.1–211.5, 348/222.1, 231.99, 333.1; 455/556.1
See application file for complete search history.

(56) References Cited

U.S. PATENT DOCUMENTS

2005/0062864 A1* 3/2005 Mabuchi ............ 348/294
2006/0018543 A1* 1/2006 Michiishita ........... 382/181
2006/0132622 A1* 6/2006 Ikeyama et al. ........ 348/231.99
2006/0284053 A1* 12/2006 Doi ..................... 250/208.1

FOREIGN PATENT DOCUMENTS

JP    7-274057    10/1995

* cited by examiner

*Primary Examiner*—Lin Ye
*Assistant Examiner*—Gevell Selby
(74) *Attorney, Agent, or Firm*—McGinn IP Law Group, PLLC

(57) ABSTRACT

An imaging module is provided and includes: an imaging portion for capturing an image of an object and outputting an image signal, AFE for subjecting the image signal from the imaging portion to an analog signal processing to be converted into digital; and a digital signal processing portion for generating image data including recording image data and displaying image data based on the image signal from AFE, in which the digital signal processing portion transmits the recording image data to a post stage device portion at a timing of rising of a synchronizing clock and transmits the displaying image data to the post stage device portion at a timing of falling of the synchronizing clock.

7 Claims, 3 Drawing Sheets

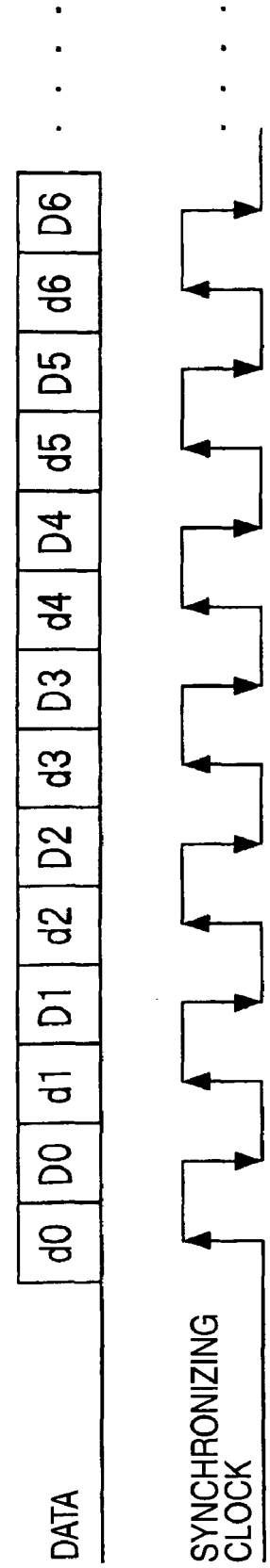

IMAGING MODULE AND DATA RECEIVING APPARATUS

FIELD OF THE INVENTION

The present invention relates to an imaging module mounted to an electronic apparatus of a cellular phone or the like.

BACKGROUND OF THE INVENTION

An electronic apparatus attached with a camera which is currently spreading includes an imaging module for generating image data by, for example, capturing an image of an object, and a device for carrying out various processings of receiving data including the image data transmitted from the imaging module, generating image data for display and displaying a through image on a display portion, and compressing the image data to be recorded in a record medium. In a background art, display of the through image and recording of the image data are carried out by time periods separate from each other and therefore, the two processings cannot simultaneously be carried out. Further, when the image data and data on an image capturing condition or the like are transmitted from the imaging module to the device, for example, it is necessary to transmit the data on the image capturing condition or the like after transmitting the image data and time is taken for transmitting the data.

JP-A-7-274057 discloses a system including a video camera in correspondence with the imaging module and an image input apparatus in correspondence with the device.

SUMMARY OF THE INVENTION

An object of an illustrative, non-limiting embodiment of the invention is to provide an imaging module capable of efficiently carrying out data transmission and promoting flexibility of a processing at a device receiving data.

An imaging module of an exemplary embodiment of the invention includes: an imaging section for capturing an image of an object and outputting an image signal; an image data generating section for generating an image data based on the image signal; and a data transmitting section for transmitting data different between at a timing of rising of a synchronizing clock and at a timing of falling of the synchronizing clock (that is, a data transmitting section for transmitting a first data at a timing of rising of a synchronizing clock and transmitting a second data at a timing of falling of the synchronizing clock). The data transmitting section transmits at least the image data (that is, at least one of the first and second data is the image data).

By the constitution, data transmission can efficiently be carried out and a flexibility of a processing at a device receiving data can be promoted.

In an imaging module according to an exemplary embodiment of the invention, the image data generating section can generate, as the image data, a displaying image data to be output to a display device and a recording image data to be recorded to a record medium, and the data transmitting section can transmit the displaying image data and the recording image data.

By the constitution, the displaying image data and the recording image data can be multiplexed to be transmitted and therefore, there can be carried out a flexible processing of recording the recording image data to the record medium while displaying the image based in the displaying image data.

In an imaging module according to an exemplary embodiment of the invention, the image data generating section can generate, as the image data, a recording image data to be recorded to a record medium, and the data transmitting section can transmit the recording image data and an image capturing condition data indicating an image capturing condition in capturing an image.

By the constitution, the image capturing condition data and the recording image data can be multiplexed to be transmitted and therefore, data transmission can efficiently be carried out.

A data receiving apparatus of an exemplary embodiment of the invention is for receiving a data including an image data transmitted from an imaging module for generating the image data by capturing an image of an object. The data includes a first data transmitted from the imaging module at a timing of rising of a synchronizing clock and a second data, which is different from the first data, transmitted from the imaging module at a timing of falling of the synchronizing clock. The data receiving apparatus includes a latching section for latching the data at a timing of at least one of the rising and falling of the synchronizing clock.

According to an exemplary embodiment of the invention, an imaging module capable of efficiently carrying out data transmission and promoting a flexibility of a processing at a device receiving the data can be provided.

BRIEF DESCRIPTION OF THE DRAWINGS

FIG. 3 is a diagram showing a data transmitting timing of an imaging module shown in FIG. 1.

DETAILED DESCRIPTION OF THE INVENTION

An exemplary embodiment of the invention will be explained in reference to the drawings as follows.

Figure 1:
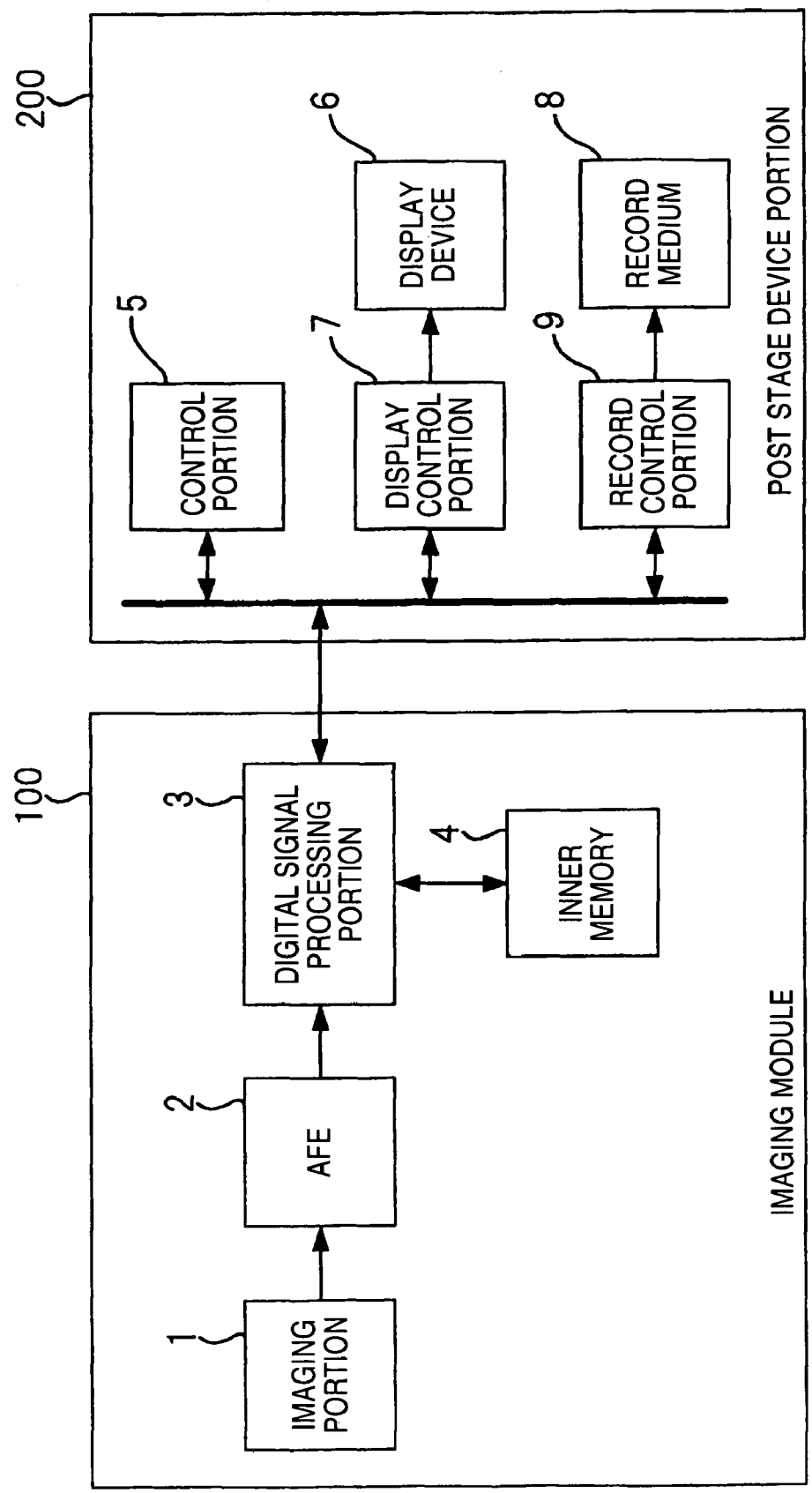
FIG. 1 is a diagram showing an outline constitution of a cellular phone with a camera for explaining an exemplary embodiment of the invention.

FIG. 1 is a view showing an outline constitution of a cellular phone with a camera for explaining an exemplary embodiment of the invention.

The cellular phone with a camera shown in FIG. 1 includes an imaging module 100 and a post stage device portion (a data receiving apparatus) 200 for receiving data transmitted from the imaging module 100 and carrying out various processings based on the data.

The imaging module 100 includes an image capturing portion 1, an analog front end (AFE) 2, a digital signal processing portion 3, and an inner memory 4.

The imaging portion 1 captures an image of an object by an optical system of an imaging lens or the like or the imaging element of a CCD image sensor or the like, and the imaging portion 1 outputs an analog image signal. AFE 2 subjects the image signal provided by the imaging portion 1 to an analog signal processing to convert the processed analog signal into a digital signal.

The digital signal processing portion 3 subjects the image signal from AFE 2 to a digital signal processing in accordance with an operational mode. The digital signal processing portion 3 includes, for example, DSP.

The inner memory 4 memorizes image data generated by the digital signal processing portion 3.

The post stage device portion 200 includes a control portion 5 for governing to control a total of the cellular phone with a camera, a display device 6 of LCD or the like, a display control portion 7 for controlling display of the display device 6, a record medium 8 of a memory card or the like, and a record control portion 9 for controlling recording data to the record medium 8. The display device 6 is a display device for displaying an image captured by the imaging portion 1 as a through image or displaying various kinds of information when the cellular phone with a camera is set to an imaging mode.

The digital signal processing portion 3, the control portion 5, the display control portion 7, and the record control portion 9 are connected by a parallel bus. The parallel bus includes a data signal line in which data flows, a clock signal line in which a synchronizing clock flows, and a control signal line in which a control signal flows.

Figure 2:
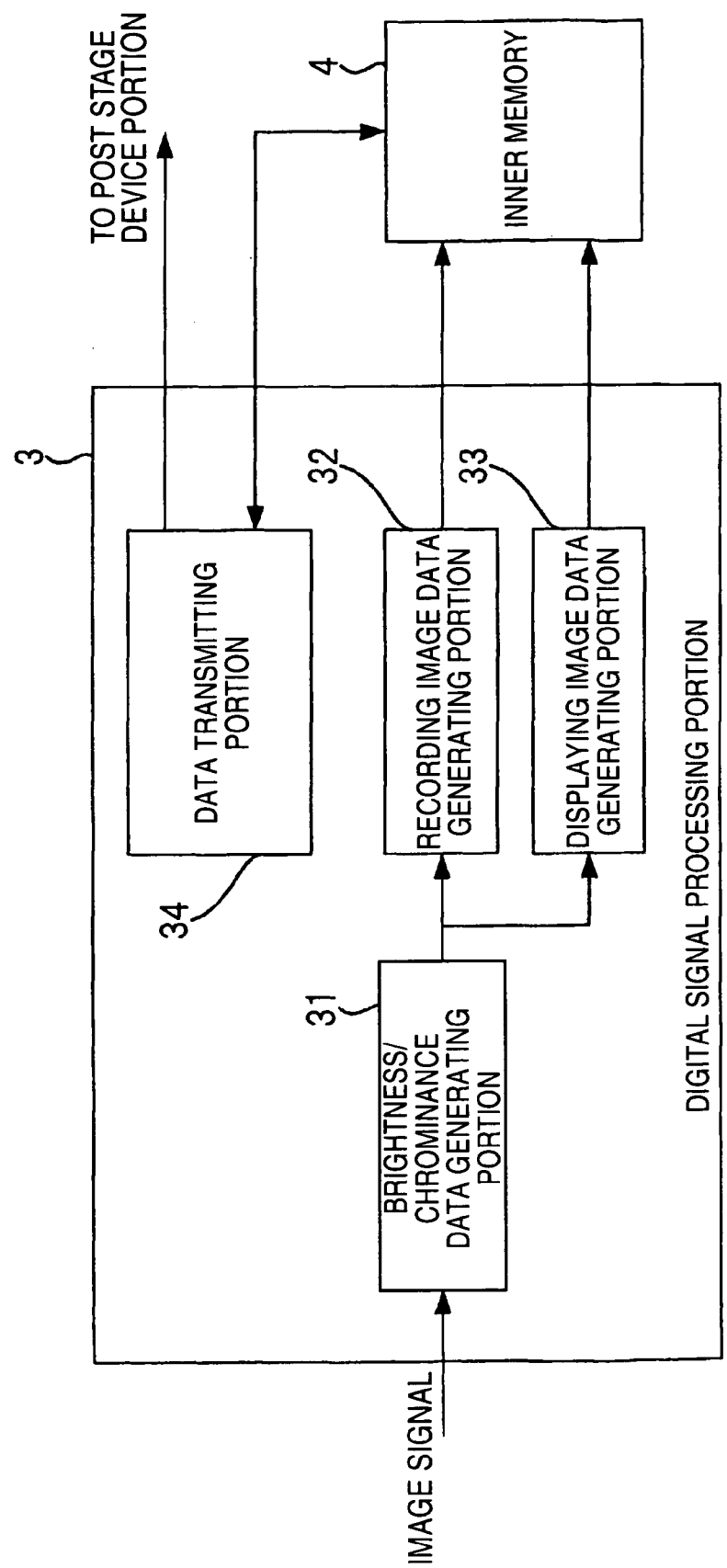
FIG. 2 is a diagram showing an outline constitution of a digital signal processing portion shown in FIG. 1.

FIG. 2 is a view showing an outline constitution of the digital signal processing portion shown in FIG. 1.

As shown by FIG. 2, the digital signal processing portion 3 includes a brightness/chrominance data generating portion 31, a recording image data generating portion 32, a displaying image data generating portion 33, and a data transmitting portion 34. The recording image data generating portion 32 and the displaying image data generating portion 33 constitute an image data generating section. (One of the portions is a first image data generating portion and the other is a second image data generating portion.)

The brightness/chrominance data generating portion 31 subjects the image signal from AFE 2 to various data signal processings of a black level correcting processing (OB processing), a linear matrix correcting processing, a white balance adjusting processing, a gamma correcting processing, a synchronizing processing, and a Y/C converting processing or the like to finally generate brightness/chrominance data.

The recording image data generating portion 32 subjects the brightness/chrominance data to a compression processing to generate recording image data including image data of a style (for example, JPEG style) suitable for recording to the record medium 8 included in the post stage device portion 200. The recording image data is recorded to the inner memory 4.

The displaying image data generating portion 33 subjects the brightness/chrominance data to a thinning processing such that a size of the data becomes the same as a display size of the display device 6 to generate displaying image data constituting image data of a style suitable for being output to the display device 6 included in the post stage device portion 200. The displaying image data is recorded to the inner memory 4.

The data transmitting portion 34 can output the synchronizing clock from the clock signal line and transmit data to the post stage device portion 200 at respective timings of rising and falling of the synchronizing clock. For example, as shown by FIG. 3, data d0 through d6 can be transmitted at a timing of rising of the synchronizing clock and data D0 through D6 can be transmitted at a timing of falling of the synchronizing clock. Further, data d0 through d6 and the data D0 through D6 may be the same data or different data.

The display control portion 7 latches data flowing on the data signal line at both of the timing of rising and falling of the synchronizing clock in the imaging mode capable of capturing the image and latches data flowing on the data signal line at the timing of falling of the synchronizing clock only when an imaging instruction is executed in an imaging mode capable of capturing an image. Further, when the display device 6 is made OFF, the display control portion 7 stops operation.

The record control portion 9 latches data flowing on the data signal line at the timing of rising of the synchronizing clock only when the imaging instruction is executed. Further, in the display device 6 being made OFF, the record control portion 9 latches data flowing on the data signal line at both of the timings of rising and falling of the synchronizing clock only when the imaging instruction is executed. The display control portion 7 and the record control portion 9 constitute a latching section. (One of the portions is a first latching portion and the other is a second latching portion.)

Next, an explanation will be given of an operation when the cellular phone attached with a camera is set to the imaging mode. In the following, an explanation will be given dividedly of a case in which the display device 6 is made ON and a case in which the display device 6 is made OFF in the imaging mode.

(When the Display Device 6 is Made ON)

When set to the imaging mode, imaging capturing is started by the imaging portion 1, displaying image data is generated by the displaying image data generating portion 33, which is recorded in the inner memory 4. The data transmitting portion 34 transmits the displaying image data recorded to the inner memory 4 to the post stage device portion 200 at both of the timings of rising and falling of the synchronizing clock.

Further, the display control portion 7 receives the displaying image data from the imaging module 100 by latching the data flowing on the data signal line at both of the timings of the rising and falling of the synchronizing clock flowing on the clock signal line, and displays an image based on the received displaying image data on the display device 6. Thereby, a through image is displayed on the display device 6 in the imaging mode.

When the imaging instruction is carried out by a user in the imaging mode, an image is captured in accordance with the instruction by the imaging portion 1, based on image signal provided by capturing the image, recording image data is generated at the recording image data generating portion 32, displaying image data is generated by the displaying image data generating portion 33, which are recorded to the inner memory 4. The displaying image data generating portion 33 continues generating displaying image data even after the imaging instruction. The data transmitting portion 34 transmits the recording image data recorded to the inner memory 4 to the post stage device portion 200 at the timing of rising of the synchronizing clock and transmits the displaying image data recorded to the inner memory 4 to the post stage device portion 200 at the timing of falling of the synchronizing clock.

Further, the record control portion 9 receives the recording image data from the imaging module 100 by latching the recording image data flowing on the data signal line at the timing of rising of the synchronizing clock flowing on the clock signal line, records the received recording image data to the record medium 8, the display control portion 7 receives the displaying image data from the imaging module 100 by latching the displaying image data flowing on the data signal line at the timing of falling of the synchronizing clock flowing on the clock signal line and displays the image based on the received displaying image data on the display device 6. Thereby, even when the imaging instruction is executed, the recording image data can be recorded to the record medium 8 without stopping to display the through image.

After transmitting the recording image data, the digital signal processing portion 3 generates image capturing condition data (for example, Exif data) showing the image capturing condition (kinds of imaging mode, record size, imaging quality, shutter speed, diaphragm value, and F value or the like) of image capturing which is carried out in accordance with the imaging instruction, transmits the image capturing condition data to the post stage device portion 200 at the timing of rising of the synchronizing clock, and transmits the displaying image data recorded to the inner memory 4 to the post stage device portion 200 at the timing of falling of the synchronizing clock.

Further, the record control portion 9 receives the image capturing condition data from the imaging module 100 by latching the image capturing condition data flowing on the data signal line at the timing of rising of the synchronizing clock flowing on the clock signal line, records the received image capturing condition data to the record medium 8 in correspondence with the already recorded recording image data, the display control portion 7 receives the displaying image data from the imaging module 100 by latching the displaying image data flowing on the data signal line at the timing of falling of the synchronizing clock flowing on the clock signal line and displays the image based on the received displaying image data on the display device 6. Thereby, the recording image data and the image capturing condition data can be made to correspond to each other to be recorded to the record medium 8 without stopping to display the through image.

(When the Display Device 6 is Made OFF)

When the display device 6 is made OFF, the displaying image data generating portion 33 and the display control portion 7 stop operating. When the imaging mode is set and the imaging instruction is executed, image capturing is carried out by the image capturing portion 1, recording image data is generated by the recording image data generating portion 32, which is recorded to the inner memory 4. Further, the digital signal processing portion 3 generates the image capturing condition data indicating the image capturing condition of image capturing which is carried out in accordance with the imaging instruction, which is recorded to the inner memory 4. Further, the data transmitting portion 34 transmits the recording image data recorded to the inner memory 4 to the post stage device portion 200 at the timing of rising of the synchronizing clock and transmits the image capturing condition data recorded to the inner memory 4 to the post stage device portion 200 at the timing of the falling of the synchronizing clock.

Further, the record control portion 9 receives the recording image data and the image capturing condition data from the imaging module 100 by latching the data flowing on the data signal line at the respective timings of rising and falling of the synchronizing clock flowing on the clock signal line and corresponds the received recording image data and the received image capturing condition data to be recorded to the record medium 8. Thereby, the recording image data and the image capturing condition data can be multiplexed to be transmitted and therefore, an efficiency of transmitting data can be promoted.

As described above, according to the embodiment, there is constructed a constitution in which the imaging module 100 transmits data at both of the timings of rising and falling of the synchronizing clock, and the display control portion 7 and the record control portion 9 included in the post stage device portion 200 receive data by latching data transmitted from the imaging module 100 at least one of the timings of rising and falling of the synchronizing clock and therefore, the efficiency of transmitting data from the imaging module 100 to the post stage device portion 200 can be promoted and a flexible data processing can be carried out at the post stage device portion 200.

For example, there can be executed a flexible processing in which the imaging module 100 transmits the recording image data at the timing of rising of the synchronizing clock and transmits the displaying image data at the timing of falling of the synchronizing clock, the record control portion 9 receives the recording image data by latching data at the timing of the rising of the synchronizing clock, and the display control portion 7 records the recording image data to the record medium 8 while displaying the through image by receiving the displaying image data by latching data at the timing of falling of the synchronizing clock.

Further, data can efficiently be transmitted from the imaging module 100 to the post stage device portion 200 by transmitting the recording image data at the timing of rising of the synchronizing clock and transmitting the image capturing condition data at the timing of falling of the synchronizing clock by the imaging module 100 and receiving the recording image data and the image capturing condition data by latching data at both of the timings of rising and falling of the synchronizing clock by the record control portion 9.

Further, although according to the above-described example, the recording image data is generated only when imaging instruction is carried out, recording image data may always be generated. In this case, a time point of setting to the imaging mode, the recording image data generating portion 32 generates recording image data, the displaying image data generating portion 33 generates displaying image data, the data transmitting portion 34 transmits the recording image data at the timing of rising of the synchronizing clock, the displaying image data is transmitted at the timing of falling of the synchronizing clock. Further, the display control portion 7 latches data always at the timing of falling of the synchronizing clock, the record control portion 9 latches data at the timing of rising of the synchronizing clock only when imaging instruction is carried out. In this way, by only switching timing of latching data at the record control portion 9, the processing of recording data to the record medium 8 while displaying the through image, or the processing of display only the through image or the like can be switched. Therefore, it is not necessary to transmit a complicated control signal from the post stage device portion 200 to the imaging module 100 after carrying out imaging instruction, and an advantage of promoting shutter response can be expected.

Further, in the above-described example, data to be transmitted at the timings of rising and falling of the synchronizing clock may be reversed. For example, when an imaging instruction is carried out, the data transmitting portion 34 may transmit the displaying image data at a timing of rising of the synchronizing clock and the recording image data may be transmitted at a timing of failing of the synchronizing clock.

Further, although according to the embodiment, an explanation as been given by taking an example of the cellular phone including the imaging module 100 and the post stage device portion 200, the above-described effect can be achieved even in a system of connecting the imaging module 100 and the post stage device portion 200 by way of a network. For example, there is conceivable a system of transmitting data by packet communication from the imaging module 100 to the post stage device portion 200 by way of a network or the like. In this case, the recording image data, the displaying image data, and the image capturing condition data or the like may be converted into data communicatable by packet communication to be transmitted.

Further, although according to the embodiment, as a combination of two different data transmitted by the data transmitting portion 34, an explanation has been given of the case in which data d0 through d6 is the recording image data and data D0 through D6 is the displaying image data, and the case in which data d0 through d6 is the recording image data and data D0 through D6 is the image capturing condition data, data d0 through d6 may be the recording image data and data D0 through D6 may be a communication control data for communicating with the post stage device portion 200, or data d0 through d6 may be the displaying image data and data D0 through D6 may be the communication control signal for communicating with the post stage device portion 200.

It will be apparent to those skilled in the art that various modifications and variations can be made to the described embodiments of the present invention without departing from the spirit or scope of the invention. Thus, it is intended that the present invention cover all modifications and variations of this consistent with the scope of the appended claims and their equivalents.

This application is based on Japanese Patent Application No. JP2005-179378, filed Jun. 20 of 2005, the contents of which is incorporated herein by reference.

What is claimed is:

1. An imaging module comprising:
   an imaging section that captures an image of an object and outputs an image signal;
   an image data generating section that generates an image data based on the image signal; and
   a data transmitting section that transmits a first data at a timing of rising of a synchronizing clock and transmits a second data at a timing of falling of the synchronizing clock, wherein the first data is different from the second data, and at least one of the first and second data is the image data.

2. The imaging module according to claim 1, wherein
   the image data comprises: a displaying image data to be output to a display device; and a recording image data to be recorded in a record medium, and
   one of the first and second data is the display image data and the other of the first and second data is the recording image data.

3. The imaging module according to claim 2, wherein the image data generating section comprises: a first image data generating section that generates the displaying image data; and a second image data generating section that generates the recording image data.

4. The imaging module according to claim 1, wherein
   the image data comprises a recording image data to be recorded in a record medium, and
   one of the first and second data is the recording image data and the other of the first and second data is a data indicating an image capturing condition in the capturing of the image.

5. A data receiving apparatus that receives a data including an image data transmitted from an imaging module for generating the image data by capturing an image of an object, the data including a first data transmitted from the imaging module at a timing of rising of a synchronizing clock and a second data different from the first data transmitted from the imaging module at a timing of falling of the synchronizing clock,
   the data receiving apparatus comprising a latching section that latches the data at a timing of at least one of the rising and falling of the synchronizing clock.

6. The data receiving apparatus according to claim 5, wherein the latching section comprises: a first latching section that latches the first data; and a second latching section that latches the second data.

7. A cellular phone with a camera, comprising:
   an imaging module comprising:
      an imaging section that captures an image of an object and outputs an image signal,
      an image data generating section that generates an image data based on the image signal, and
      a data transmitting section that transmits a first data at a timing of rising of a synchronizing clock and transmits a second data at a timing of falling of the synchronizing clock, wherein the first data is different from the second data, and at least one of the first and second data is the image data; and
   a data receiving apparatus comprising:
      a first latching section that latches the first data at the timing of rising of the synchronizing clock; and
      a second latching section that latches the second data at the timing of falling of the synchronizing clock.

* * * * *